(12) United States Patent
Yasumura

(10) Patent No.: US 6,317,337 B1
(45) Date of Patent: Nov. 13, 2001

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/708,854

(22) Filed: Nov. 7, 2000

Related U.S. Application Data

(63) Continuation of application No. 09/436,154, filed on Nov. 9, 1999, now abandoned.

(30) Foreign Application Priority Data

Nov. 10, 1998 (JP) .................................................. 10-319386

(51) Int. Cl.$^7$ ................................................... H02M 3/335
(52) U.S. Cl. ............................ 363/21.04; 363/19; 363/97
(58) Field of Search .................................. 363/15, 16, 19, 363/21.04, 21.08, 97, 131

(56) References Cited

U.S. PATENT DOCUMENTS

| | | | |
|---|---|---|---|
| 4,453,206 | * | 6/1984 | Voight ..................................... 363/97 |
| 4,628,426 | | 12/1986 | Steigerwald . |
| 4,736,283 | | 4/1988 | Yasumura . |
| 5,216,585 | * | 6/1993 | Yasumura .............................. 363/19 |
| 5,973,937 | * | 10/1999 | Yasumura .............................. 363/19 |

OTHER PUBLICATIONS

Patent Abstracts of Japan vol. 1996, No. 07, Jul. 1996 (Jul. 31, 1996) of JP 08 066026 A (Sony Corp), Mar. 8, 1996 (Mar. 8, 1996).

Laouamer, Brunello, Ferrieux, Normand, Bucheit: "A Multi–Resonant Converter For Non–Contact Charging With Electromagnetic Coupling" Industriel 23rd International Conference on Electronics, Control and Instrumentation IECON 97, No. 2, 1997 pages 792–797, XP002145223.

* cited by examiner

*Primary Examiner*—Peter S. Wong
*Assistant Examiner*—Gary L. Laxton
(74) *Attorney, Agent, or Firm*—Frommer Lawrence & Haug LLP.; William S. Frommer; Gordon Kessler

(57) ABSTRACT

A switching power supply circuit has an insulated converter transformer with a gap for a loose coupling. on the secondary side, a parallel resonant capacitor is connected parallel to a secondary winding, and a full-wave rectification circuit produces a secondary-side DC output voltage for increasing a maximum load power. On the primary side, an ordinary full-wave rectification circuit, rather than a voltage doubler rectifying circuit, inputs a rectified and smoothed voltage having a level corresponding to the level of an AC input voltage. A constant-voltage control circuit system for stabilizing a secondary output voltage varies a switching frequency depending on the level of the secondary output voltage to perform composite control over a resonant impedance of a primary parallel resonant circuit and a conduction angle of the switching element.

7 Claims, 13 Drawing Sheets

F I G. 7
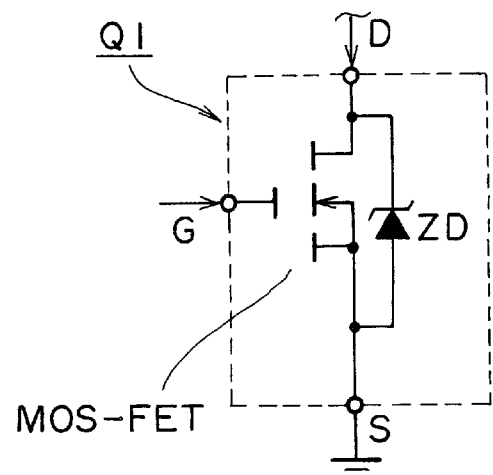
F I G. 8
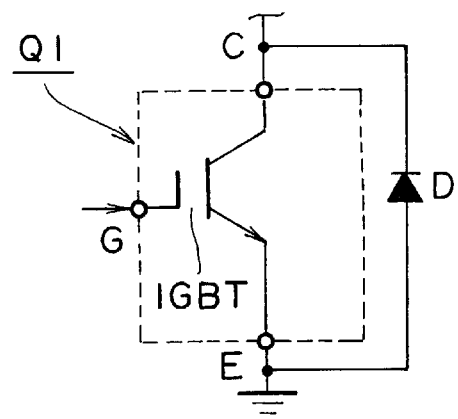
F I G. 9
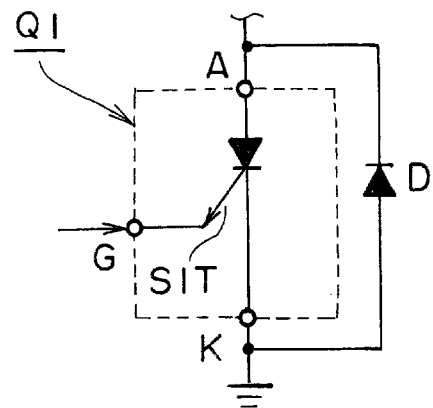

SWITCHING POWER SUPPLY CIRCUIT

This appln is a continuation of Ser. No. 09/436,154 filed Nov. 9, 1999, abandoned.

BACKGROUND OF THE INVENTION

The present invention relates to a switching power supply circuit for use as a power supply for various electronic devices.

Switching power supply circuits that are widely known in the prior art employing a switching converter such as a flyback converter or a forward converter. These switching converters suffer a limitation on the suppression of switching noise because the switching waveform is rectangular. It is also known that their operating characteristics pose a limitation on efforts to increase the power conversion efficiency.

The applicant of the present application has proposed various switching power supply circuits that employ various resonant converters. The resonant converters are capable of easily achieving a high power conversion efficiency and are subject to low noise because the switching waveform becomes sinusoidal. The resonant converters are also advantageous in that they can be constructed of a relatively small number of parts.

FIG. 10 of the accompanying drawings shows an embodiment of a switching power supply circuit based on an invention proposed by the applicant.

The switching power supply circuit shown in FIG. 10 is capable of a maximum load power of 150 W or higher in a commercial power supply system of AC 100 V available in Japan and the U.S.A.

The switching power supply circuit shown in FIG. 10 has a voltage doubler rectifying circuit comprising rectifying diodes Di1, Di2 and smoothing capacitors Ci1, Ci2 as a rectifying and smoothing circuit for rectifying and smoothing a commercial AC power supply AC. The voltage doubler rectifying circuit generates a DC input voltage 2Ei which is about twice a DC input voltage Ei that corresponds to the peak value of the AC power supply AC. If the AC input voltage VAC of the AC power supply AC is VAC=144 V, for example, then the DC input voltage 2Ei is about 400 V.

The voltage doubler rectifying circuit is used as the rectifying and smoothing circuit in order to meet the relatively high load condition of the maximum load power of 150 W or higher in the commercial power supply system of AC 100 V. Stated otherwise, since the DC input voltage is about twice the ordinary DC input voltage, the amount of a current flowing into a switching converter in a following stage is suppressed to keep the components of the switching power supply circuit reliable.

A rush current limiting resistor Ri is inserted in a rectifying current path of the voltage doubler rectifying circuit for suppressing a rush current which flows into smoothing capacitors when the power supply is turned on.

In FIG. 10, tne switching power supply circuit includes a self-excited voltage-resonant switching converter including a switching element Q1 which comprises a high-withstand-voltage bipolar transistor (BJT: junction transistor).

The switching element Q1 has a base connected to the positive terminal of the smoothing capacitor Ci1 (the rectified and smoothed voltage 2Ei) via a starting resistor RS, so that a base current will be produced from the rectifying and smoothing line when the switching power supply circuit starts to operate. A resonant circuit for self-excited oscillation, which comprises a series-connected circuit of an inductor LB, a detecting drive winding NB, a resonant capacitor CB, and a base current limiting resistor RB, is connected between the base of the switching element Q1 and primary-side ground.

A clamping diode DD inserted between the base of the switching element Q1 and the negative terminal of the smoothing capacitor C1 (primary-side ground) forms a path of a damper current which flows when the switching element Q1 is turned off. The switching element Q1 has a collector connected to a terminal of a primary winding N1 of a crossed insulated converter transformer PIT. The emitter of the switching element Q1 is connected to the ground.

A parallel resonant capacitor Cr is connected parallel between the collector and emitter of the switching element Q1. The capacitance of the parallel resonant capacitor Cr, and the combined inductance (L1+Lc) obtained by a series-connected circuit of the leakage inductance L1 of the primary winding N1 of the crossed insulated converter transformer PRT and the inductor Lc of a choke coil PCC jointly make up a primary-side parallel resonant circuit of the voltage-resonant converter. Although not described in detail here, when the switching element Q1 is turned off, the parallel resonant circuit causes a voltage Vcr across the resonant capacitor Cr to have a sine-wave pulse waveform, resulting in voltage-resonant operation.

The choke coil PCC has the inductor Lc and the detecting drive winding NB connected to each other as a transformer. The detecting drive winding NB induces an alternating voltage corresponding to a switching period due to a switching output transmitted from the primary winding N1 of the crossed insulated converter transformer PRT to the inductor Lc.

The crossed insulated converter transformer PRT has a function to transmit the switching output of the switching element Q1 to a secondary side thereof and also to perform constant-voltage control on the secondary-side output.

As shown in FIG. 11 of the accompanying drawings, for example, the crossed insulated converter transformer PRT comprises a three-dimensional core 200 having two double-C-shaped cores 201, 202 each with four magnetic legs, the magnetic legs of the double-C-shaped cores 201, 202 being connected at ends thereof to each other. The insulated converter transformer PRT has a primary winding N1 and a secondary winding N2 which are wound around two magnetic legs of the three-dimensional core 200 in one direction, and a control winding NC wound around two magnetic legs of the three-dimensional core 200 perpendicularly to the primary winding N1 and the secondary winding N2. The crossed insulated converter transformer PRT is thus constructed as a saturable reactor. The mating ends of the magnetic legs of the double-C-shaped cores 201, 202 are joined to each other with no gap defined therebetween.

The primary winding N1 of the crossed insulated converter transformer PRT has a terminal connected to the collector of the switching element Q1 and another terminal connected to the positive terminal of the smoothing capacitor C1 (the rectified and smoothed voltage 2Ei) via the series-connected inductor Lc of the choke coil PCC.

An alternating voltage is induced across the secondary winding N2 of the crossed insulated converter transformer PRT by the primary winding N1 thereof. A secondary-side parallel resonant capacitor C2 is connected parallel to the secondary winding N2, and the leakage inductance L2 of the secondary winding N2 and the capacitance of the secondary-side parallel resonant capacitor C2 jointly make up a parallel resonant circuit, which causes the alternating voltage to be induced as a resonant voltage across the secondary winding N2, thereby providing voltage resonant operation on the secondary side.

To the parallel resonant circuit on the secondary side, there are connected rectifying diodes D01, D02, D03, D04 and smoothing capacitors C01, C02 as shown via central taps of the secondary winding N2. The rectifying diodes D01, D02 and the smoothing capacitor C01 make up a full-wave rectification circuit, and the rectifying diodes D03, D04 and the smoothing capacitor C02 make up another full-wave rectification circuit.

The full-wave rectification circuit which is constructed of the rectifying diodes D01, D02 and the smoothing capacitor C01 is supplied with the resonant voltage from the parallel resonant circuit on the secondary side and generates a DC output voltage E01. The full-wave rectification circuit which is constructed of the rectifying diodes D03, D04 and the smoothing capacitor C02 is supplied with the resonant voltage from the parallel resonant circuit on the secondary side and generates a DC output voltage E02.

The DC output voltage E01 and the DC output voltage E02 are applied separately to a control circuit 1. The control circuit 1 employs the DC output voltage E01 as a detected voltage and the DC output voltage E02 as an operating power supply of the control circuit 1.

The control circuit 1 supplies a direct current whose level is variable depending on the level of the DC output voltage E01 to the control winding NC of the crossed insulated converter transformer PRT for thereby performing constant-voltage control as follows:

For example, when the AC input voltage VAC or the DC output voltage E01 varies due to a fluctuation of load power, the control circuit 1 changes a control current flowing through the control winding NC within a predetermined range.

Since the control winding NC is wound in the crossed insulated converter transformer PRT, leakage inductances L1, L2 can vary in the crossed insulated converter transformer PRT which is a saturable reactor.

As described above, the leakage inductance L1 of the primary winding N1 forms the primary-side parallel resonant circuit, and the leakage inductance L2 of the secondary winding N2 forms the secondary-side parallel resonant circuit. When the control current flowing through the control winding NC changes, the inductances L1, L2 are varied. Since the resonant impedances of the primary and secondary sides are also varied by the varying inductances L1, L2, the switching output transmitted from the primary side to the secondary side also varies for thereby making the secondary-side DC voltages E01, E02 constant. The above constant-voltage control process will hereinafter be referred to as a "parallel resonant frequency control process".

FIG. 12 of the accompanying drawings shows another switching power supply circuit based on an invention proposed by the applicant. The switching power supply circuit shown in FIG. 12 is also compatible with a maximum load power of 150 W or higher in a commercial power supply system of AC 100 V available in Japan and the U.S.A., as with the switching power supply circuit shown in FIG. 10. The switching power supply circuit includes a self-excited voltage-resonant switching converter including a switching element Q1 on a primary side.

Those parts in FIG. 12 which are identical to those shown in FIG. 10 are denoted by identical reference characters, and will not be described in detail below.

The switching power supply circuit shown in FIG. 12 has a crossed control transformer PRCT. As shown in FIG. 13, the crossed control transformer PRCT comprises a three-dimensional core 200 having two double-C-shaped cores 201, 202 each with four magnetic legs, the magnetic legs of the double-C-shaped cores 201, 202 being connected at ends thereof to each other. The crossed control transformer PRCT also comprises a controlled winding NR having a predetermined number of turns wound around two magnetic legs of the three-dimensional core 200 and a control winding NC wound around two magnetic legs of the three-dimensional core 200 perpendicularly to the controlled winding NR. The crossed control transformer PRCT is thus constructed as a saturable reactor.

The crossed control transformer PRCT can be regarded as a variable-inductance element, and is smaller in size than the crossed insulated converter transformer PRT shown in FIG. 11.

The controlled winding NR is inserted between the positive terminal of the smoothing capacitor Ci1 and the primary winding N1 of an insulated converter transformer PIT. In the power supply circuit shown in FIG. 12, a combined inductance (L1+LR) of a series-connected circuit of the leakage inductance L1 of the primary winding N1 side of the insulated converter transformer PIT and the inductance LR of the controlled winding NR, and the capacitance of the parallel resonant capacitor Cr jointly make up a parallel resonant circuit which performs primary-side switching operation as voltage-resonant operation.

As shown in FIG. 14, the insulated converter transformer PIT has an EE-shaped core 100 comprising two E-shaped cores 101, 102 of ferrite. No gap is defined between central magnetic legs of the E-shaped cores 101, 102. A primary winding N1 (and a detecting drive winding NB) and a secondary winding N2 are separately wound on the central magnetic legs, with separate bobbins actually used. The primary winding N1 and the secondary winding N2 provide a loose coupling of a coupling coefficient k≈0.9.

A mutual inductance M of the insulated converter transformer PIT, due to the inductance L1 of the primary winding N1 and the inductance L2 of the secondary winding N2, may be +M (additive polarity mode) or −M (subtractive polarity mode) depending on the relationship between the polarities (winding directions) of the primary winding N1 and the secondary winding N2 and the connection of the rectifying diode D0 (D01, D02).

When the insulated converter transformer PIT operates in the connection shown in FIG. 15(a) of the accompanying drawings, the mutual inductance M becomes +M, and when the insulated converter transformer PIT operates in the connection shown in FIG. 15(b), the mutual inductance M becomes −M. In the illustrated circuits, the polarities of the primary winding N1 and the secondary winding N2 are in the additive polarity mode.

A secondary-side parallel resonant capacitor C2 is connected parallel to the secondary winding N2 of the insulated converter transformer PIT, providing a parallel resonant circuit.

The parallel resonant circuit causes the alternating voltage to be induced as a resonant voltage across the secondary winding N2. The resonant voltage is applied to two half-wave rectifying circuits, one comprising a rectifying diode D01 and a smoothing capacitor C02 and one comprising a rectifying diode D02 and the smoothing capacitor C02. The half-wave rectifying circuits produce respective DC output voltages E01, E02.

The rectifying diodes D01, D02 of the half-wave rectifying circuits are of the high-speed type because of rectifying an alternating voltage in a switching period.

For example, when the AC input voltage VAC or the DC output voltage E02 on the secondary side varies due to a fluctuation of load power, the control circuit 1 changes a control current flowing through the control winding NC within a range from 10 mA to 40 mA, for example. The inductance LR of the controlled winding NR thus changes in a range from 0.1 mH to 0.6 mH, for example.

Inasmuch as the controlled winding NR forms the parallel resonant circuit for providing voltage-resonant switching operation, the resonant condition of the parallel resonant circuit varies with respect to the switching frequency which is fixed. A sine-wave resonant pulse is produced across the parallel-connected circuit of the switching element Q1 and the parallel resonant capacitor Cr in an off period of the switching element Q1 because of operation of the parallel resonant circuit. The duration of the resonant pulse is variably controlled when the resonant condition of the parallel resonant circuit varies. That is, PWM (Pulse Width Modulation) control operation is achieved with respect to the resonant pulse. The PWM control of the duration of the resonant pulse is equivalent to the control of the off period of the switching element Q1. Stated otherwise, the on period of the switching element Q1 is variably controlled under the condition of the fixed switching frequency. When the on period of the switching element Q1 is thus variably controlled, the switching output transmitted from the primary winding N1 forming the parallel resonant circuit to the secondary side is varied, and the output level of the DC output voltages E01, E02 on the secondary side is also varied for thereby making the DC output voltages E01, E02 constant. The above constant-voltage control process will hereinafter be referred to as a "primary-side voltage resonant pulse duration control process".

FIG. 16 shows still another switching power supply circuit based on an invention proposed by the applicant. Those parts in FIG. 16 which are identical to those shown in FIGS. 10 and 12 are denoted by identical reference characters, and will not be described in detail below.

In the power supply circuit shown in FIG. 16, the crossed control transformer PRCT has a controlled winding on the secondary side.

The controlled winding of the crossed control transformer PRCT comprises two controlled windings NR, NR1. The controlled winding NR is connected in series between a terminal of the secondary winding N2 and the anode of the rectifying diode D01, and the controlled winding NR1 is connected in series between a tap output of the secondary winding N2 and the anode of the rectifying diode D02. In this connection, a secondary-side parallel resonant circuit includes inductances LR, LR1 of the controlled windings NR, NR1.

In the case where the controlled windings NR, NR1 of the crossed control transformer PRCT are on the secondary side, the inductances LR, LR1 of the controlled windings NR, NR1 are varied to variably control the pulse duration of a resonant voltage V2 across the secondary-side parallel resonant capacitor C2, i.e., the conduction angles of the secondary-side rectifying diodes. Constant-voltage control can be achieved by thus controlling the output level available on the secondary side.

The insulated converter transformer PIT provided to the power supply circuit has a structure which is the same as the structure shown in FIG. 14. The crossed control transformer PRCT has also a structure which is the same as the structure shown in FIG. 13 except that the controlled winding NR1 is additionally wound perpendicularly to the control winding NC. The crossed control transform r PRCT of the power supply circuit shown in FIG. 12 has the controlled winding NR inserted in the primary side and hence needs to have an insulation distance from the control winding NC that is connected to the secondary side in a DC manner, so that the crossed control transformer PRCT is required to have a corresponding size. However, the crossed control transformer PRCT of the power supply circuit shown in FIG. 16 may be smaller in size because the controlled winding NR1 is disposed in the secondary side and does not need to have an insulation distance from the control winding NC.

The switching power supply circuits shown in FIGS. 10 through 16 are compatible with the AC input voltage VAC of AC 100 V and the maximum load power of 150 W or higher, and hence the DC input voltage having a level of 2 Ei is produced by the voltage doubler rectifying circuit. Therefore, actually, a resonant voltage Vcr of 1800 V is generated across the switching element Q1 and the parallel resonant capacitor Cr when the switching element Q1 is turned off.

Therefore, the switching element Q1 and the parallel resonant capacitor Cr are required to be able to withstand the high voltage of 1800 V. Consequently, the switching element Q1 and the parallel resonant capacitor Cr are accordingly large in size. If a component of a high withstand voltage is used as the switching element Q1 in particular, then since a saturation voltage VCE(SAT), a storage time tSTG, and a fall time tf is large, and a current amplification factor hFE is small, it is difficult to set the switching frequency high. If the switching frequency is low, then the switching loss and the drive power are increased, resulting in a correspondingly increased power loss of the power supply circuit. The transformers in the power supply circuit and capacitors in the drive circuit are larger in size and more expensive, presenting an obstacle to efforts to reduce the size, weight, and cost of the power supply circuit.

In any of the constant-voltage control systems show in FIGS. 10, 12, and 16, the (crossed) insulated converter transformer PIT (PRT) which separates the primary side and the secondary side from each other has a certain coupling achieved in the absence of a gap, and the winding (inductor) Lc of the choke coil or the controlled winding NR of the crossed control transformer PRCT is connected in series to the primary winding N1 or the secondary winding N2. Therefore, the leakage inductance in the power supply circuit increases. The increase in the leakage inductance results in an increase in the leakage flux, possibly affecting an electric circuit as a load.

Actually, in order to reduce the effect of the leakage flux, the switching converter as a whole is housed in a shield case of aluminum having vent holes defined therein, and connected to input and output lines by connectors. Such a structure prevents the power supply circuit from being reduced in size, weight, and cost, and causes the power supply circuit to be manufactured for a considerably long period of time.

SUMMARY OF THE INVENTION

It is therefore an object of the present invention to provide a resonant power supply circuit which is reduced in size, weight, and cost, can be manufactured with an increased efficiency, and has improved characteristics including a power conversion efficiency.

According to the present invention, there is provided a power supply circuit comprising rectifying and smoothing means for being supplied with a commercial AC power supply, generating a rectified and smoothed voltage having a level equal to the level of the commercial AC power supply, and outputting the generated rectified and smoothed voltage as a DC input voltage, an insulated converter transformer having a gap to provide a co pling coefficient for a loose coupling, for transmitting a primary-side output to a secondary side, switching means for turning on and off the DC input voltage with a switching element and outputting the DC input voltage which has been turned on and off to a primary winding of the insulated converter transformer, a primary-side parallel resonant circuit comprising at least an inductance including a leakage inductance of the primary winding of the insulated converter transformer and a capacitance of a parallel resonant capacitor, for causing the switching means to operate in a voltage-resonant manner, a secondary-side parallel resonant circuit including a secondary-side parallel resonant capacitor connected parallel to a secondary winding of the insulated converter transformer, the secondary-side parallel resonant circuit comprising an inductance of the secondary winding including a leakage inductance of the insulated converter transformer and a capacitance of the secondary-side parallel resonant capacitor, DC output voltage generating means for being supplied with an alternating voltage induced across the secondary winding of the insulated converter transformer, and rectifying the alternating voltage by way of full-wave rectification to generate a secondary-side DC output voltage which is substantially equal to the level of the input voltage, and constant-voltage control means for varying a switching frequency of the switching element depending on the level of the secondary-side DC output voltage to effect composite control on a resonant impedance of the primary-side parallel resonant circuit and a conduction angle of the switching element thereby to perform constant-voltage control over a secondary-side output voltage.

With the above arrangement, on the primary side, a voltage-resonant converter is provided, and the insulated converter transformer has a loose coupling. On the secondary side, the secondary-side parallel resonant circuit and a full-wave rectification circuit generate the secondary-side DC output voltage to supply the load with an electric power. Therefore, a given load condition is handled by the secondary-side full-wave rectification circuit which basically utilizes parallel resonant operation. On the primary side, therefore, the full-wave rectification circuit for generating a rectified and smoothed voltage equal to the level of the AC input voltage, rather than a voltage doubler rectifying circuit, is employed.

In the above arrangement for constant-voltage control, the switching frequency is varied depending on the level of the secondary-side output voltage for thereby simultaneously controlling the resonant impedance of the primary-side parallel resonant circuit and the conduction angle of the switching element. The control sensitivity is improved by the above composite control operation.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a circuit diagram of a modification of the present invention;

FIG. 8 is a circuit diagram of another modification of the present invention;

FIG. 9 is a circuit diagram of still another modification of the present invention;

DETAILED DESCRIPTION OF THE PREFERRED EMBODIMENTS

Figure 1:
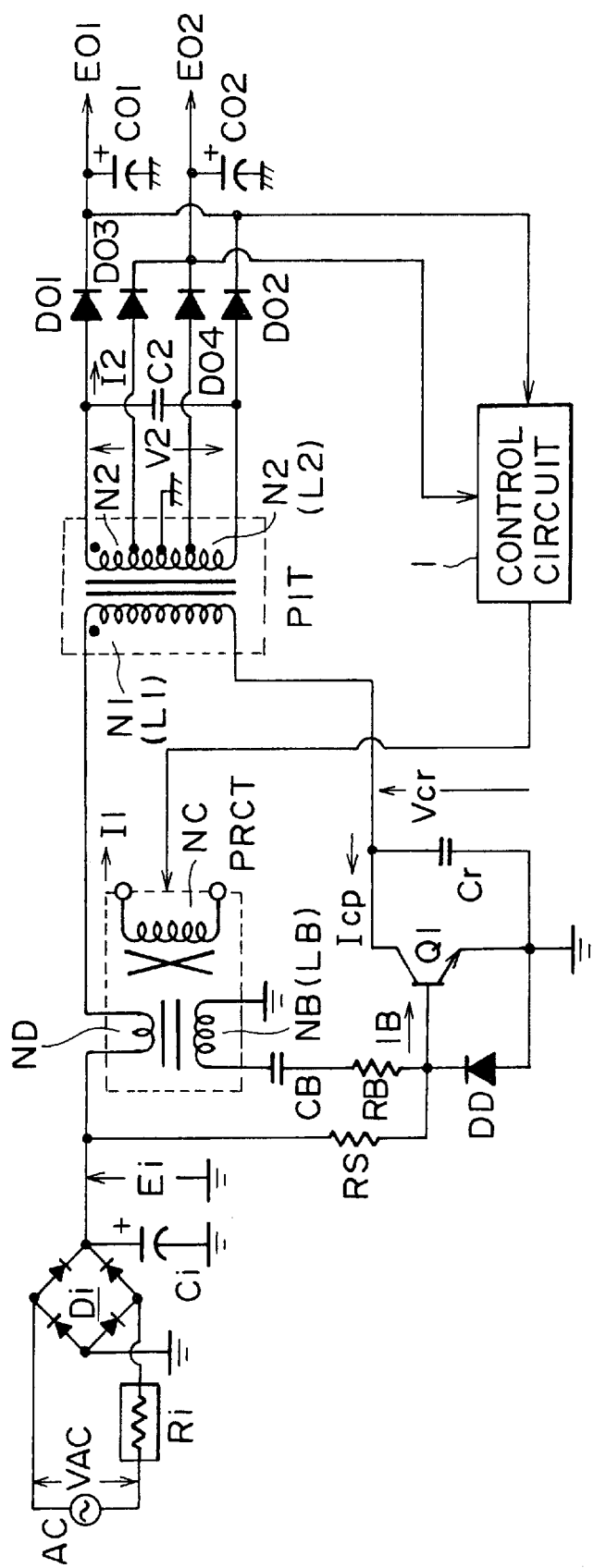
FIG. 1 is a circuit diagram of a power supply circuit according to a first embodiment of the present invention.
Figure 10:
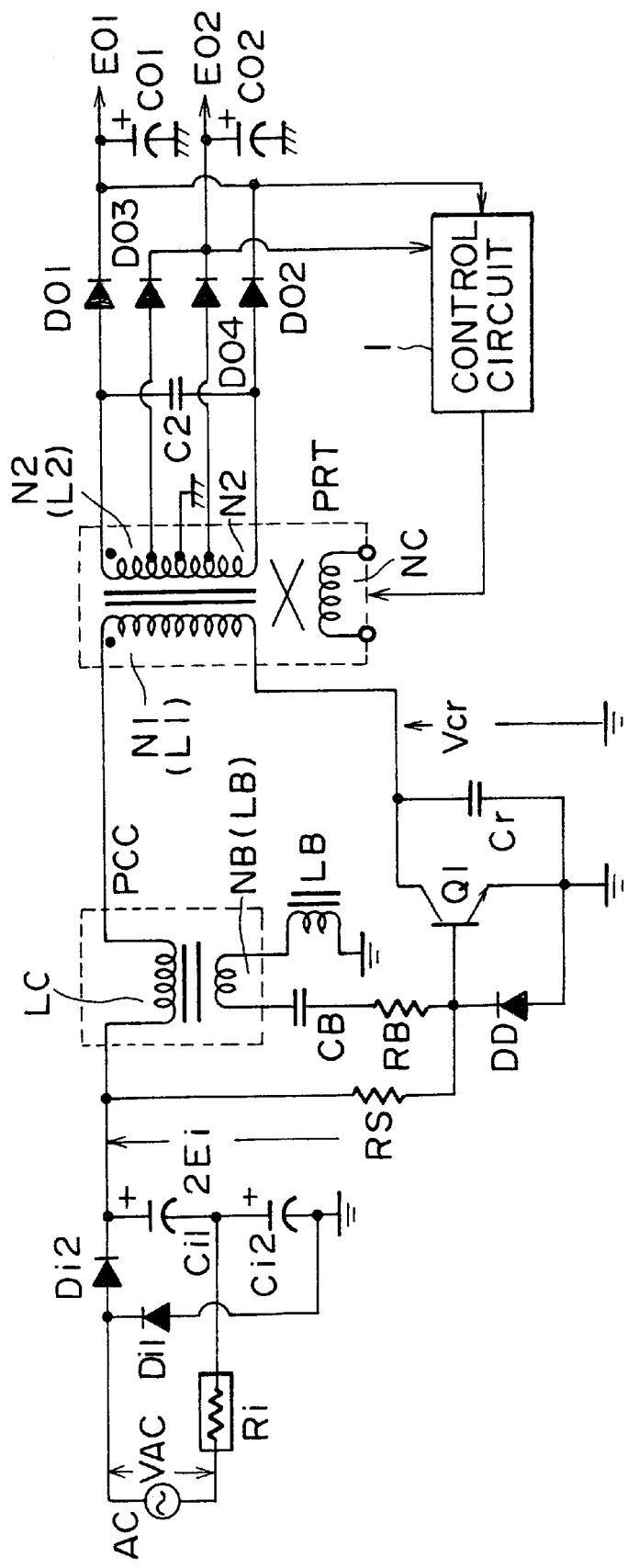
FIG. 10 is a circuit diagram of a conventional power supply circuit.
Figure 11:
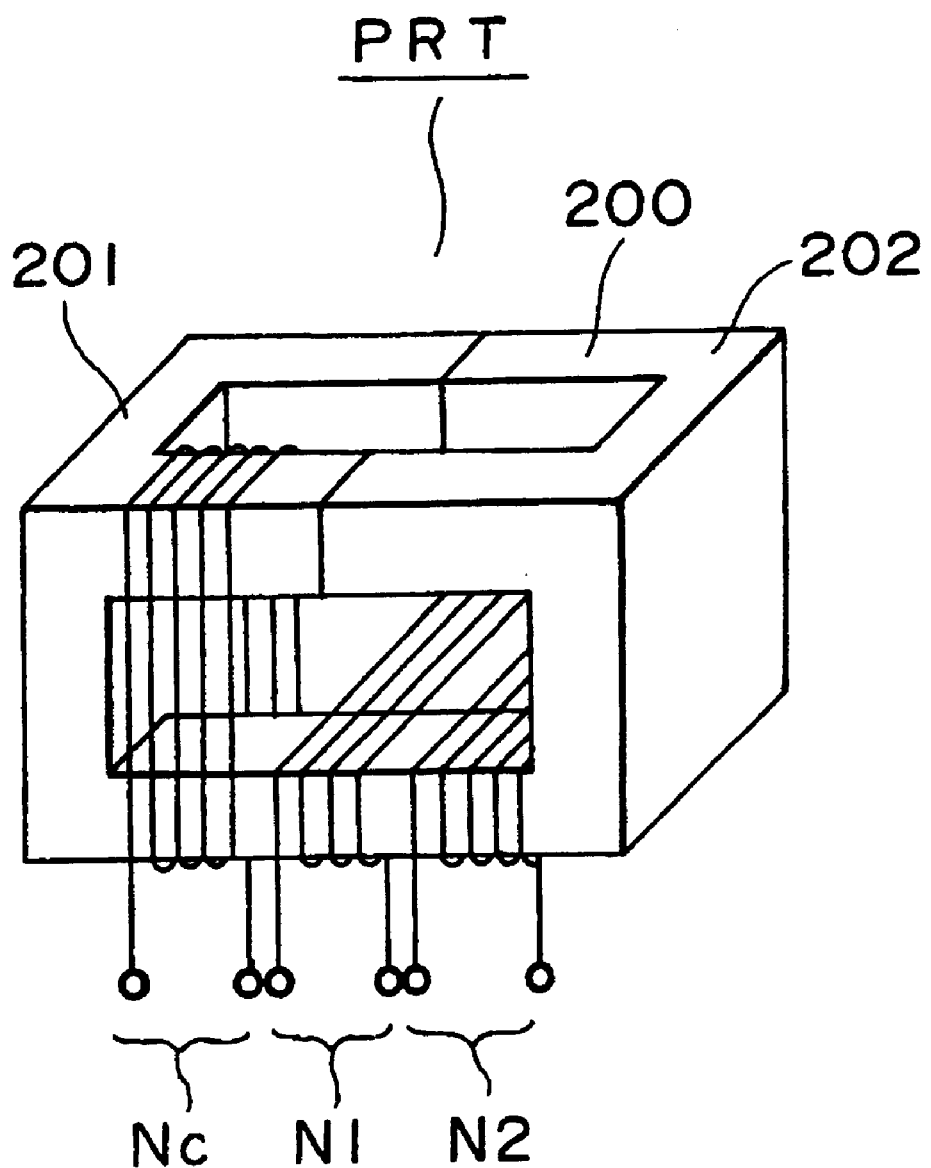
FIG. 11 is a perspective view of a crossed insulated converter transformer in the power supply circuit shown in FIG. 10.
Figure 12:
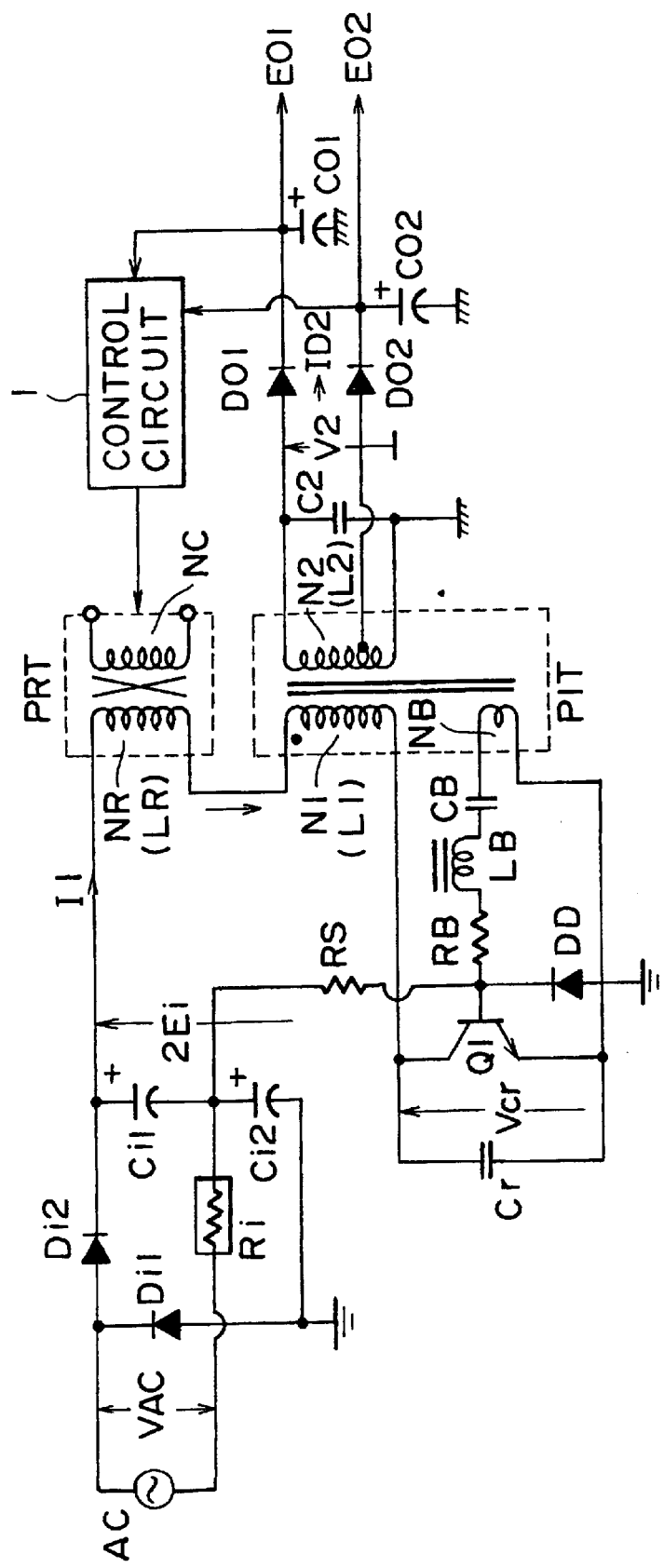
FIG. 12 is a circuit diagram of another conventional power supply circuit.
Figure 13:
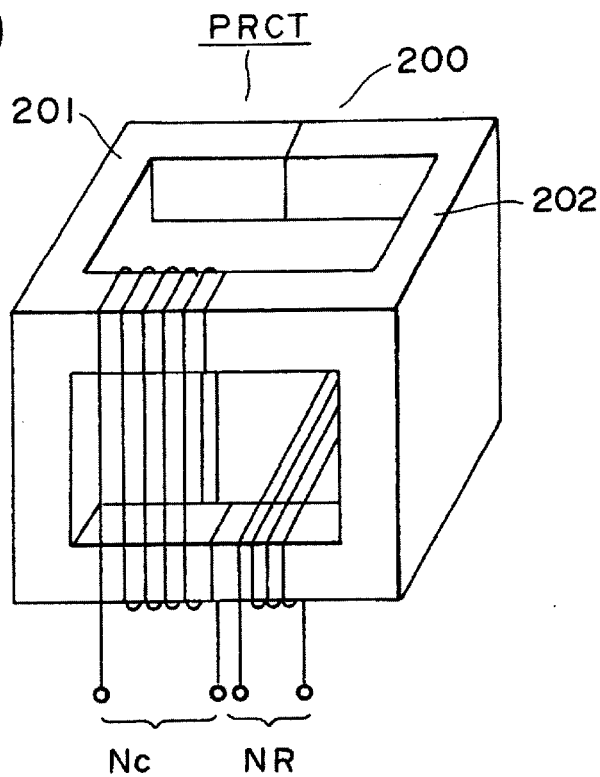
FIG. 13 is a perspective view of a crossed control transformer in the power supply circuit shown in FIG. 12.
Figure 16:
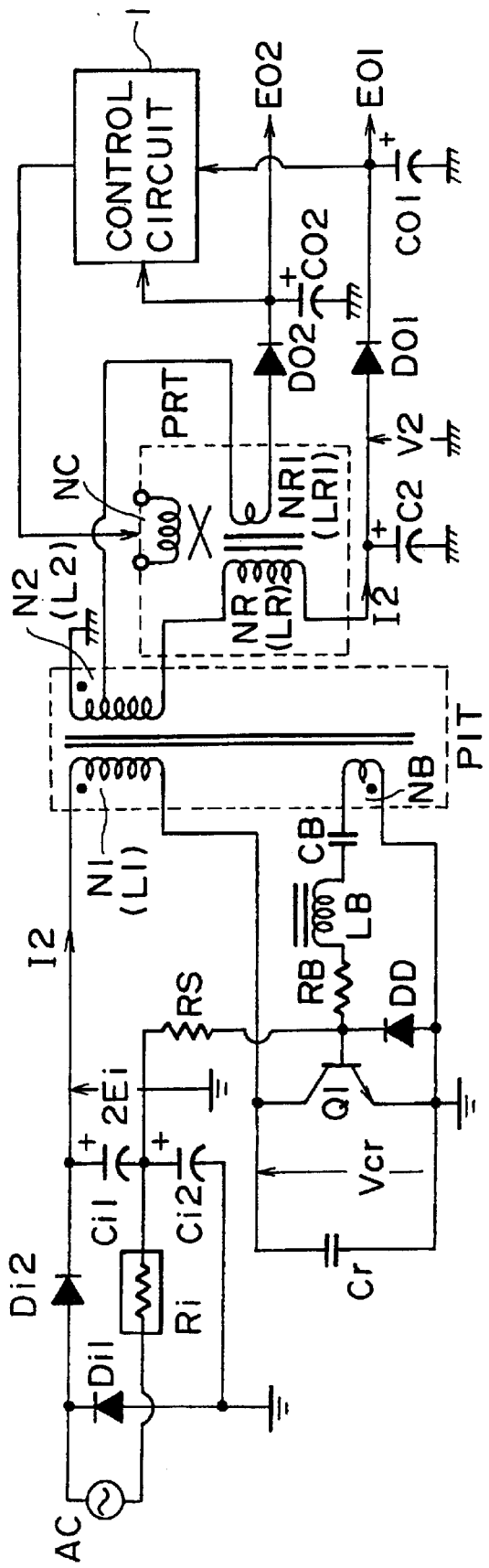
FIG. 16 is a circuit diagram of still another conventional power supply circuit.

FIG. 1 shows a power supply circuit according to a first embodiment of the present invention. The power supply circuit shown in FIG. 1 has a self-excited voltage-resonant switching converter including a switching element (bipolar transistor) on a primary side, as with the power supply circuits shown in FIGS. 10, 12, and 16. Those parts in FIG. 1 which are identical to those shown in FIGS. 10, 12, and 16 are denoted by identical reference characters, and will not be described in detail below.

The power supply circuit shown in FIG. 1 has a full-wave rectification circuit comprising a bridge rectification circuit Di and a smoothing capacitor Ci, as a rectifying and smoothing circuit for producing a DC input voltage from an AC input voltage VAC. The full-wave rectification circuit generates a rectified and smoothed voltage Ei corresponding to the level of the AC input voltage VAC. Therefore, the power supply circuit shown in FIG. 1 does not have a voltage doubler rectifying circuit as is the case with the conventional power supply circuits.

In this specification, a rectifying circuit for generating the rectified and smoothed voltage Ei corresponding to the level of the AC input voltage VAC is also referred to as an "equal-voltage rectifying circuit".

The power supply circuit shown in FIG. 1 includes a crossed control transformer PRCT in the form of a saturable reactor comprising a detecting winding ND, a drive winding NB, and a control winding NC.

Figure 2:
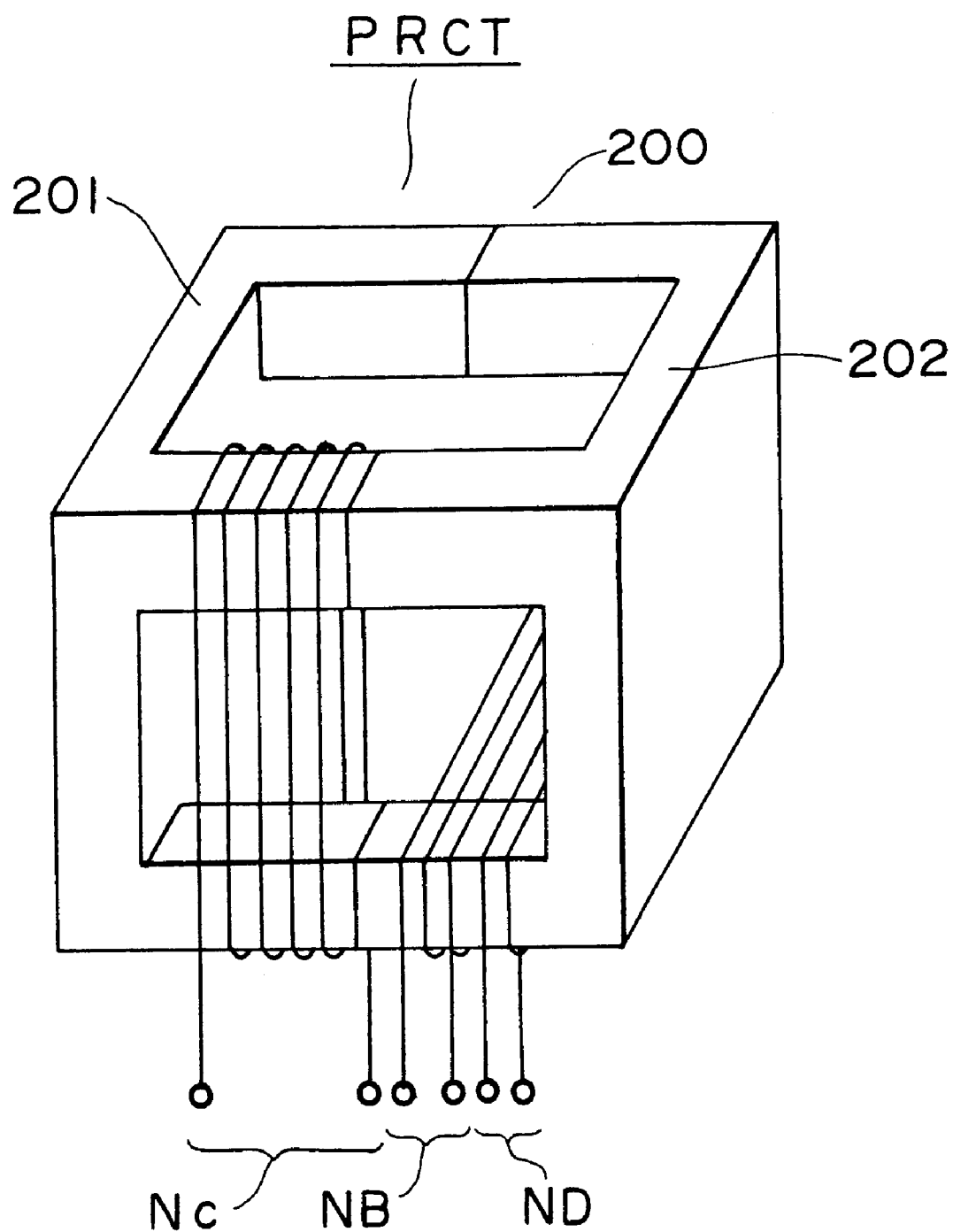
FIG. 2 is a perspective view of a crossed control transformer in the power supply circuit shown in FIG. 1.

As shown in FIG. 2, the crossed control transformer PRCT comprises a three-dimensional core 200 having two double-C-shaped cores 201, 202 each with four magnetic legs, the magnetic legs of the double-C-shaped cores 201, 202 being connected at ends thereof to each other. The detecting winding ND and the drive winding NB are wound around two magnetic legs of the three-dimensional core 200 in one direction, and the control winding NC is wound around two magnetic legs of the three-dimensional core 200 perpendicularly to the detecting winding ND and the drive winding NB.

The detecting winding ND, the drive winding NB, and the control winding NC have respective numbers of turns selected such that the detecting winding ND=1 T (turn), the drive winding NB=3T, and the control winding NC=1000 T. The crossed control transformer PRCT is small in size and weight such that its weight is about 7 grams.

The detecting winding ND of the crossed control transformer PRCT is inserted in series between the positive terminal of the smoothing capacitor Ci and the primary winding N1 of the insulated converter transformer PIT, so that the switching output of the switching element Q1 is transmitted via the primary winding N1 to the detecting winding ND. In the crossed control transformer PRCT, the drive winding NB is excited by the switching output across the detecting winding ND to produce an alternating voltage across the drive winding NB. The alternating voltage is a source of the drive voltage for the self-excited oscillation drive circuit.

The control circuit 1 varies the level of a control current (direct current) flowing through the control winding NC depending on changes in the level of the secondary-side DC output voltage for thereby variably controlling the inductance LB of the drive winding NB wound in the crossed control transformer PRCT. Therefore, the resonant condition of the series resonant circuit in the self-excited oscillation drive circuit for the switching element Q1, which includes the inductance LB of the drive winding NB is varied. As described later on with reference to FIG. 4, the varying resonant condition changes the switching frequency of the switching element Q1 for stabilizing the secondary-side DC output voltage.

Figure 3:
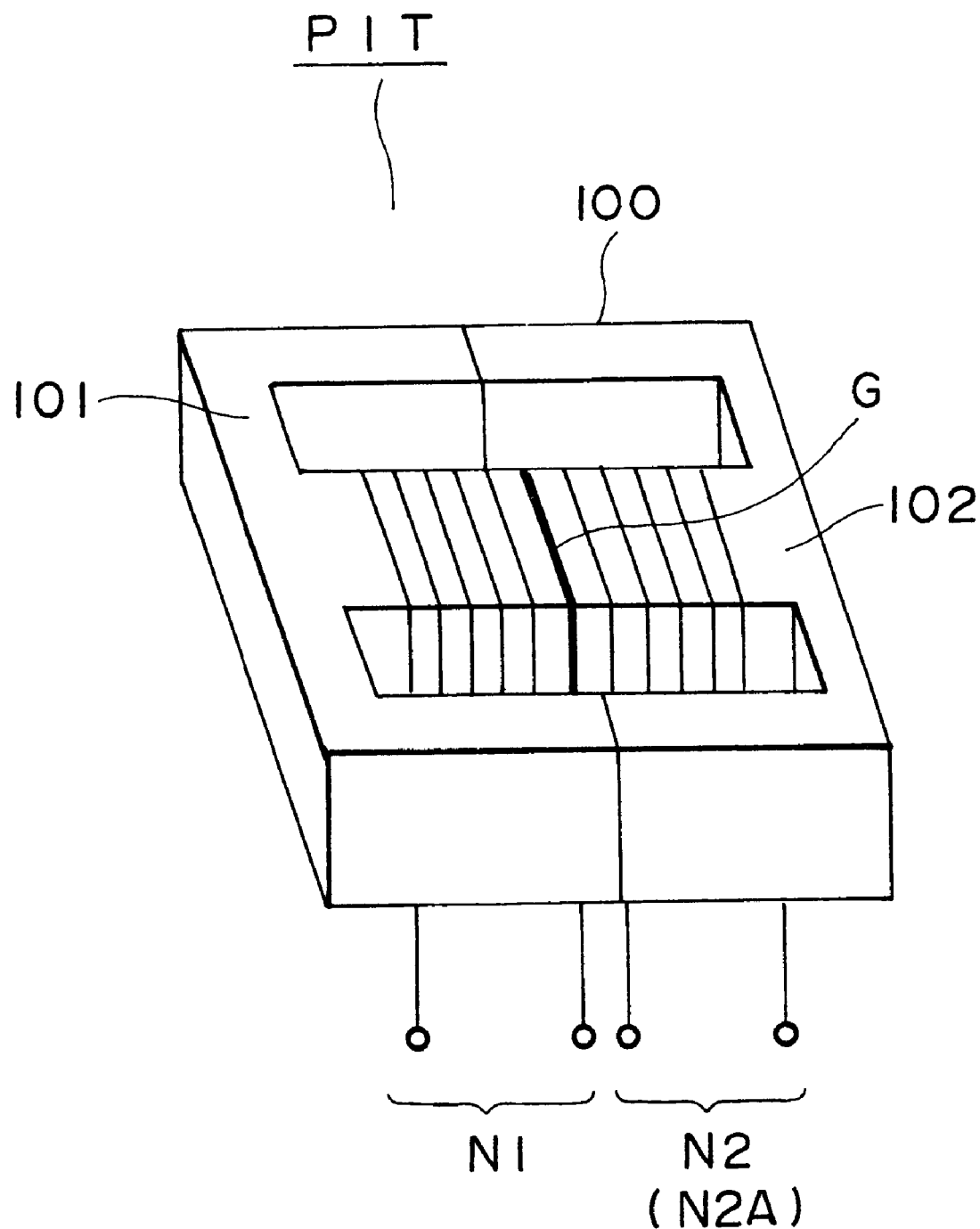
FIG. 3 is a perspective view of an insulated converter transformer in the power supply circuit shown in FIG. 1.

As shown in FIG. 3, the insulated converter transformer PIT comprises an EE-shaped core 100 comprising two E-shaped cores 101, 102 of ferrite with their magnetic legs confronting each other. The primary winding N1 and the secondary winding N2 (and N2A) are separately wound on the central magnetic legs of the EE-shaped core 100, with separate bobbins whose winding portions are separate on the primary and secondary sides being actually used. A gap G is defined between the central magnetic poles. The gap G can be produced by making the central magnetic poles of the E-shaped cores 101, 102 shorter than the two outer magnetic poles.

Figure 14:
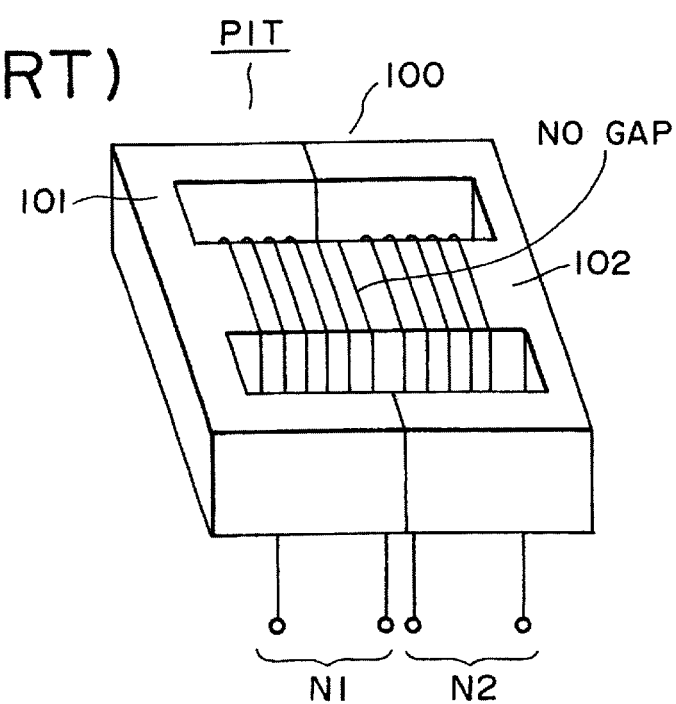
FIG. 14 is a perspective view of an insulated converter transformer in the power supply circuit shown in FIG. 12.
Figure 15A:
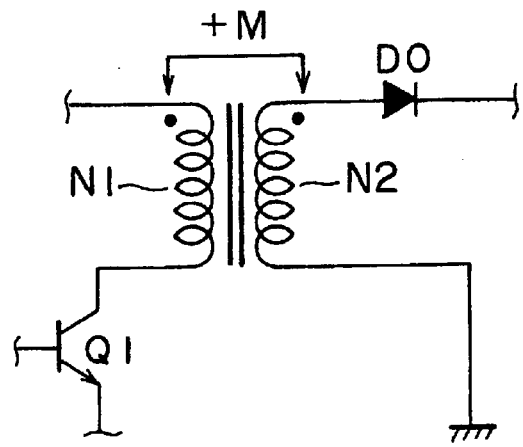
FIGS. 15(a) and 15(b) are circuit diagrams illustrative of operation when a mutual inductance is +M/–M.
Figure 15B:
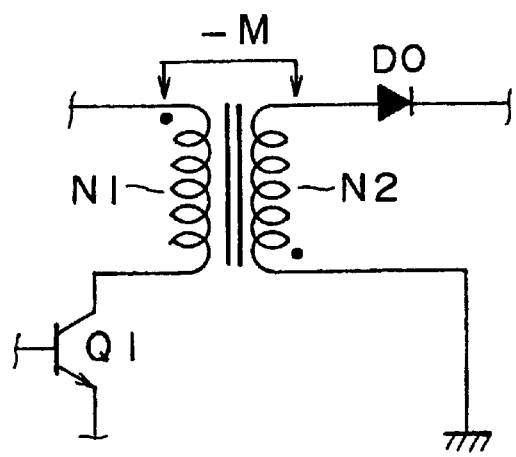

The insulated converter transformer PIT thus has a loose coupling of a coupling coefficient smaller than the conventional insulated converter transformer PIT shown in FIG. 14, so that the insulated converter transformer PIT is less saturable. The coupling coefficient k is k≈0.85, for example.

On the secondary side of the insulated converter transformer PIT, the secondary-side parallel resonant capacitor C2 is connected parallel to the secondary winding N2. The leakage inductance L2 of the secondary winding N2 and the capacitance of the secondary-side parallel resonant capacitor C2 jointly make up a parallel resonant circuit, which causes the alternating voltage to be induced as a resonant voltage across the secondary winding N2, thereby providing voltage resonant operation on the secondary side.

To the parallel resonant circuit on the secondary side, there are connected rectifying diodes D01, D02, D03, D04 and smoothing capacitors C01, C02 as shown via central taps of the secondary winding N2. The rectifying diodes D01, D02 and the smoothing capacitor C01, 002 make up a full-wave rectification circuit, and the rectifying diodes D03, D04 and the smoothing capacitor C02 make up another full-wave rectification circuit.

The full-wave rectification circuit which is constructed of the rectifying diodes D01, D02 and the smoothing capacitor C01 is supplied with the resonant voltage from the parallel resonant circuit on the secondary side (the secondary winding) and generates a DC output voltage E01. The full-wave rectification circuit which is constructed of the rectifying diodes D03, D04 and the smoothing capacitor C02 is supplied with the resonant voltage from the parallel resonant circuit on the secondary side (the secondary winding) and generates a DC output voltage E02.

The DC output voltage E01 and the DC output voltage E02 are applied separately to the control circuit 1. The control circuit 1 employs the DC output voltage E01 as a detected voltage and the DC output voltage E02 as an operating power supply of the control circuit 1.

With the above arrangement, the primary side provides the parallel resonant circuit which performs voltage-resonant switching operation, and the secondary side also provides the parallel resonant circuit that is composed of the secondary winding N2 and the parallel resonant capacitor C2. In this specification, the switching converter which operates with the resonant circuits in the respective primary and secondary sides is referred to as a "composite resonant switching converter".

Figure 4:
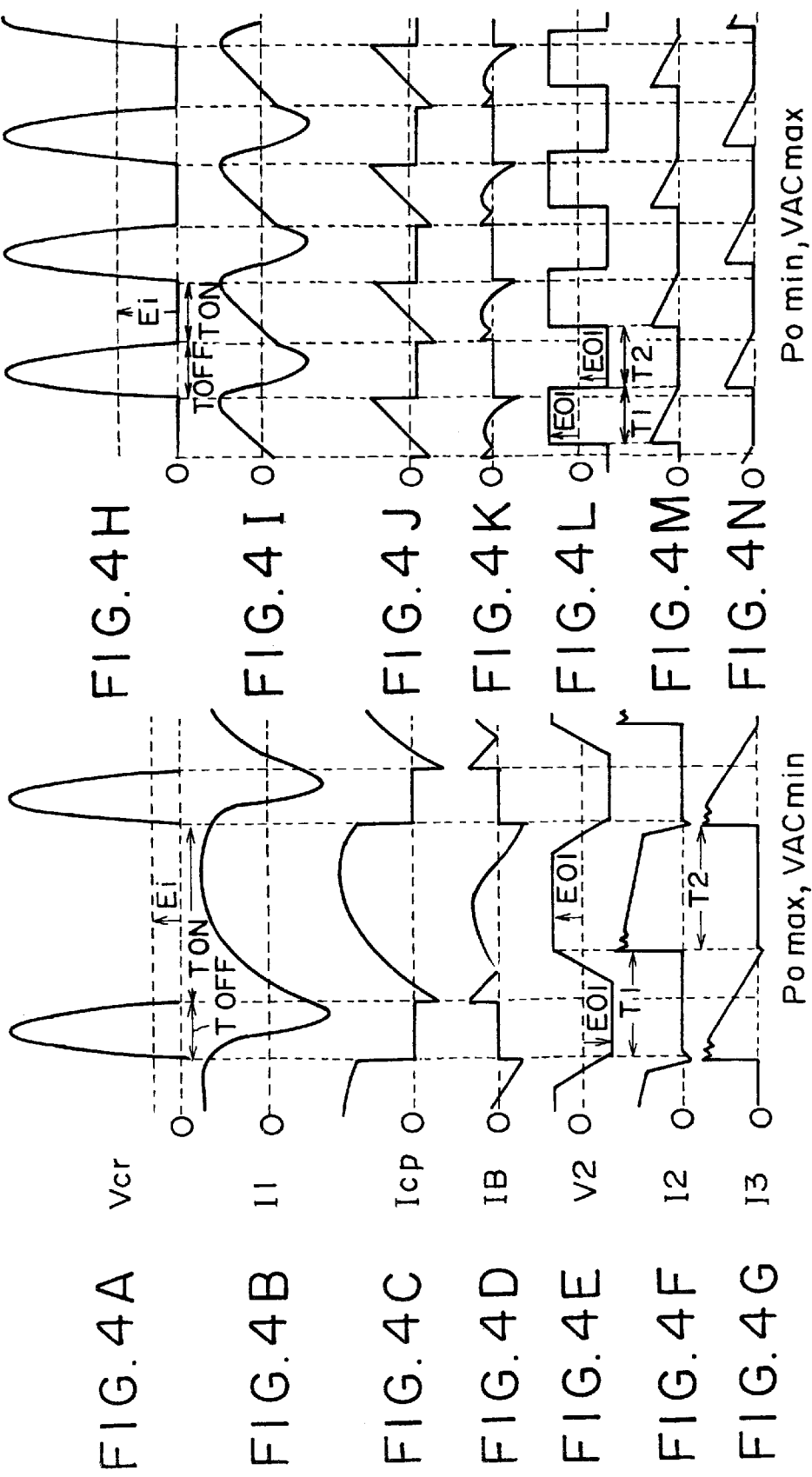
FIGS. 4(a) through 4(n) are diagrams showing an operation of various parts of the power supply circuit shown in FIG. 1.

FIGS. 4(*a*) through 4(*g*) are illustrative of operation of various parts of the power supply circuit shown in FIG. 1. FIGS. 4(*a*) through 4(*g*) show operating waveforms of the various parts at a maximum load power (Pomax) and a minimum guaranteed AC input voltage (VACmin). FIGS. 4(*h*) through 4(*n*) show operating waveforms of the same parts as those in FIGS. 4(*a*) through 4(*g*) at a minimum load power (Pomin) and a maximum guaranteed AC input voltage (VACmax).

The self-excited oscillation drive circuit for the switching element Q1 causes a base current (drive current) IB to flow to the base of the switching element Q1, as shown in FIGS. 4(*d*) and 4(*k*). The drive current IB enables the switching element Q1 to perform switching operation. At this time, a collector current Icp flowing through the collector of the switching element Q1 has waveforms shown in FIGS. 4(*c*) and 4(*j*). A parallel resonant voltage Vcr is generated by the parallel resonant circuit across the parallel-connected circuit of the switching element Q1 and the parallel resonant capacitor Cr, as shown in FIGS. 4(*a*) and 4(*h*). The parallel resonant voltage Vcr is of such a waveform that it has a level of 0 during a period TON in which the switching element Q1 is turned on and it is applied as a sine-wave pulse during a period TOFF in which the switching element Q1 is turned off, and is suitable for voltage-resonant operation.

The above switching operation on the primary side produces a switching output across the primary winding N1.

This operation is indicated by a switching output current I1 flowing from the smoothing capacitor Ci via the detecting winding ND and the primary winding N1 to the primary-side switching converter, as shown in FIGS. 4(*b*) and 4(*i*), the switching output current I1 having a smooth waveform close to a sine wave due to the voltage-resonant operation.

The switching output produced on the primary side as described above is induced across the secondary winding N2. As described above, the secondary side has the parallel resonant circuit (the parallel-connected circuit of the secondary winding N2 and the secondary-side parallel resonant capacitor C2). The secondary-side alternating voltage V2 applied from the parallel resonant circuit to the rectifying diodes D01, D02 has waveforms shown in FIGS. 4(e) and 4(l). The full-wave rectification circuit on the secondary side is supplied with the secondary-side alternating voltage V2 and performs a rectifying operation as follows:

In a period T1 in which the rectifying diode D01 is turned off and the rectifying diode D02 is turned on, the full-wave rectification circuit operates in the subtractive polarity mode in which the polarities of the primary winding N1 and the secondary winding N2 are −M, charging the smoothing capacitor C01 with a rectified current I3 (FIGS. 4(g) and 4(n)) rectified by the rectifying diode D02.

In a period T2 in which the rectifying diode D02 is turned off and the rectifying diode D01 is turned on, the smoothing capacitor C01 is charged with a rectified current I2 (FIGS. 4(f) and 4(m)) rectified by the rectifying diode D01.

As described above, the full-wave rectification is performed using both the additive polarity mode (+M: forward operation) and the subtractive polarity mode (−M: flyback operation), so that the smoothing capacitor C01 produces the DC output voltage E01 which is substantially equal to the voltage induced across the secondary winding N2. In this embodiment, therefore, the DC output voltage on the secondary side is produced by the full-wave rectification that is performed using the mutual inductance in both operation modes of +M and −M. The electric power supplied to the load is increased, therefore, resulting in an increase in the maximum load power.

The arrangement for performing the full-wave rectification is achieved by providing the gap G in the insulated converter transformer PIT for a loose coupling of a predetermined coupling coefficient to make the insulated converter transformer PIT less saturable. If the insulated converter transformer PIT has no gap G as is conventional, then the insulated converter transformer PIT is likely to be saturated and malfunction upon flyback operation, making it difficult to achieve the full-wave rectification in the above embodiment.

In the secondary-side full-wave rectification circuit of the above circuit arrangement, the voltage applied to the rectifying diodes D01, D02 is clamped to the level of the secondary-side output voltage E01 when they are turned off, as can be understood from the waveforms shown in FIGS. 4(e) and 4(l). If the actual secondary-side output voltage E01 is 135 V, then products having a withstand voltage of 150 V can be used as the rectifying diodes D0, D02.

As is apparent from the foregoing description, the power supply circuit according to the present embodiment has the voltage-resonant converter (parallel resonant circuit) on the primary side and the composite resonant switching converter having the parallel resonant circuit and the full-wave rectification circuit on the secondary side.

In order to enable the power supply circuit shown in FIG. 12, for example, to produce a constant voltage so that the secondary-side DC output voltage E0=135 V, it is necessary to control the switching frequency fs in a range of Δ 150 kHz between 75 kHz and 225 kHz. With the arrangement of the power supply circuit shown in FIG. 12, however, the switching frequency of the switching element Q1 has a limitation up to about 50 kHz because of the withstand voltage thereof.

In the power supply circuit according to the embodiment shown in FIG. 1, the switching frequency fs may be controlled in a range of Δ 75 kHz between 100 kHz and 175 kHz, which is about ½ of the conventional range. In the present embodiment, the switching frequency can easily be increased, as described above.

The range in which the switching frequency is controlled can be reduced in the present embodiment for the following reasons:

In this embodiment, the constant-voltage control can be achieved by variably controlling the switching frequency of the switching element Q1 according to the operation of the constant-voltage control circuit system which is composed of the control circuit 1 and the crossed control transformer, as described above. As can be seen from comparison between the waveforms Vcr, Icp, IB shown in FIGS. 4(a), 4(c), (d) and FIGS. 4(h), 4(j), 4(k), the switching frequency is varied by variably controlling the period TOFF in which the switching element Q1 is turned off and the period TON in which the switching element Q1 is turned on. In this embodiment, therefore, the switching frequency is variably controlled for constant-voltage control operation to effect resonant impedance control on the switching output and at the same time to control the conduction angle (PWM control) of the switching element in the switching period. The above composite control operation is achieved by one control circuit system. Actually, the period TON for Pomax and VACmin to which the waveforms shown in FIGS. 4(a), 4(c), (d) correspond is reduced to about ⅓ for Pomin and VACmax to which the waveforms shown in FIGS. 4(h), 4(j), 4(k) correspond. Consequently, the current II flowing from the smoothing capacitor Ci into the voltage-resonant converter is limited to about ⅓ as indicated by a transition from FIG. 4(b) to FIG. 4(i). Therefore, the control sensitivity is improved to increase the substantial control range. Thus, as described above, the variable range of the switching frequency may be smaller than heretofore.

The inductance and the capacitance may be selected to equalize the parallel resonant frequency fo1 of the primary-side parallel resonant circuit and the series resonant frequency fo2 of the secondary-side series resonant circuit as to fo1=f02=75 kHz with respect to the switching frequency fs. With the inductance and the capacitance thus selected, the resonant impedance difference is reduced to increase the transmission efficiency from the primary side to the secondary side for thereby increasing the maximum load power that can be handled.

Since the maximum load power is increased as described above, it is not necessary to employ a voltage doubler rectifying system as the rectifying and smoothing circuit for generating the DC input voltage to cover the load power. Therefore, as described above with reference to FIG. 1, the ordinary equal-voltage rectifying circuit in the form of the bridge rectifying circuit can be employed.

At the time the AC input voltage VAC is 144 V, the rectified and smoothed voltage Ei is about 200 V. The resonant voltage Vcr across the parallel-connected circuit of the switching element Q1 and the secondary-side parallel resonant capacitor Cr, as shown in FIGS. 4(a) and 4(h), is generated when the switching element Q1 is turned off because the primary-side parallel resonant circuit acts on the rectified and smoothed voltage Ei. In this embodiment, since the rectified and smoothed voltage Ei is about ½ of the rectified and smoothed voltage upon voltage doubler rectification, the resonant voltage vcr is held to about ½ of the resonant voltage Vcr (1800 V) generated by the conventional power supply circuits shown in FIGS. 10, 12, and 16. Inasmuch as the conduction angle of the switching element Q1 is variably controlled (PWM control), as described above, the peak value of the resonant voltage Vcr is controlled so as to be substantially constant regardless of an increase in the AC input voltage VAC. As a consequence, the resonant voltage Vcr is held to a substantially constant level of about 900 V at its peak, in the power supply circuit according to the present embodiment.

In the present embodiment, therefore, products having a withstand voltage of 900 V may be selected as the switching element Q1 and the parallel resonant capacitor Cr.

Because products of a withstand voltage lower than the withstand voltage of the conventional products may be employed as the switching element Q1, the parallel resonant capacitor Cr, and the rectifying diodes on the secondary side, accordingly, the components may be inexpensive. Therefore, without having to take into account increases in the cost, products with increased characteristics (good characteristics of the saturation voltage VCE(SAT), the storage time tSTG, the fall time tf, and the current amplification factor hFE for the switching element Q1, and good characteristics of a forward voltage drop VF and a reverse recovery time trr for the rectifying diodes) may be selected for the switching element Q1 and the bridge rectifying circuit DO, for example.

With the above increased characteristics, it is possible to make the switching frequency higher than conventional, and hence to make the power loss smaller and make the various components smaller in size and weight. Therefore, various characteristics such as the power conversion efficiency of the power supply circuit can be increased, and the power supply circuit can be reduced in size, weight, and cost, as compared with the conventional power supply circuit.

Furthermore, in the view of a reduction of the power supply circuit in size and weight, the conventional voltage doubler rectifying circuit requires two sets of rectifying diodes and smoothing capacitors. In this embodiment, since the full-wave rectification circuit composed of the bridge rectifying circuit is employed, one set of block-type smoothing capacitor and bridge rectifying diodes is employed, resulting in a reduction in the cost and size.

The equal-voltage rectifying circuit is effective in making the number of turns of the primary winding N1 smaller than heretofore for an improvement in the constant-voltage control sensitivity.

In the power supply circuits shown in FIGS. 10, 12, and 16, the inductor of the power choke coil or the controlled winding NR of the crossed control transformer PRCT is connected in series to the primary winding N1 or the secondary winding N2. In this embodiment, these windings are not connected in series to the primary winding N1 or the secondary winding N2. In FIG. 1, the detecting winding ND is connected in series to the primary winding N1. The number of turns of the detecting winding ND is 1T, for example, and it has an inductance that can be ignored for increasing the leakage inductance of the insulated converter transformer PIT.

Therefore, the source of leakage flux in the entire switching converter (power supply circuit) is only the insulated converter transformer PIT. only a short ring of copper plate in the transformer is sufficient to provide against the leakage flux. The shield case of aluminum which is required by the power supply circuits shown in FIGS. 10, 12, and 16 is not necessary.

Figure 5:
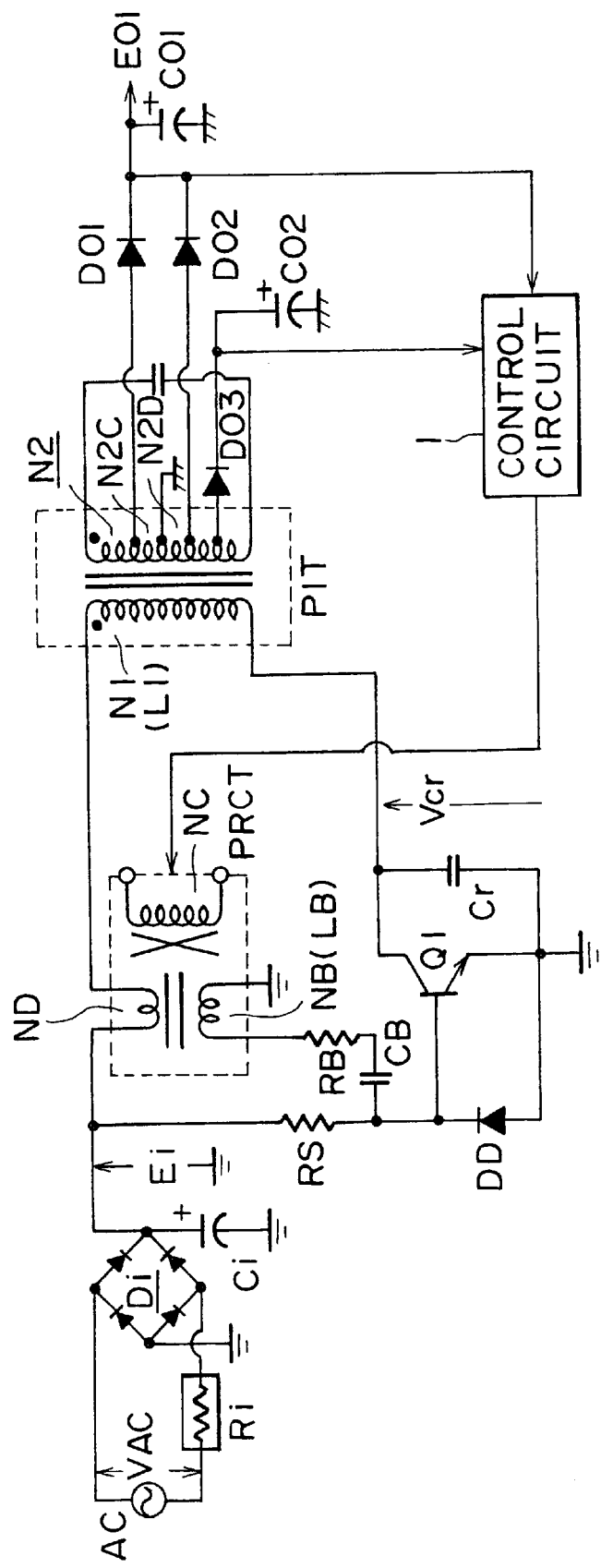
FIG. 5 is a circuit diagram of a power supply circuit according to a second embodiment of the present invention.

FIG. 5 shows a power supply circuit according to a second embodiment of the present invention. Those parts in FIG. 5 which are identical to those shown in FIG. 1 are denoted by identical reference characters, and will not be described in detail below.

The power supply circuit shown in FIG. 5 has a primary side which is identical to the primary side of the power supply circuit shown in FIG. 1, and the insulated converter transformer PIT of the power supply circuit shown in FIG. 5 may be of a structure which is the same as the structure shown in FIG. 3.

On the secondary side of the power supply circuit shown in FIG. 5, the secondary winding N2 has a central tap connected to ground, which divides the secondary winding N2 into two sections. The sections of the secondary winding N2 have tap outputs to which the anodes of the rectifying diodes D01, D02 are connected, and the cathodes of the rectifying diodes D01, D02 are connected to the positive terminal of the smoothing capacitor C01. The rectifying diodes D01, D02 and the smoothing capacitor C01 jointly make up a secondary-side full-wave rectification circuit.

The parallel resonant capacitor C2 is connected parallel to the secondary winding N2, making up the parallel resonant circuit on the secondary side.

With the full-wave rectification circuit comprising the rectifying diodes D01, D02 and the smoothing capacitor C01, the rectifying diodes D01, D02 rectify the alternating voltage produced by windings N2C, N2D which are partial windings of the secondary winding N2. This arrangement corresponds to the connection of the full-wave rectification circuit comprising the rectifying diodes D03, D04 and the smoothing capacitor C02 shown in FIG. 1, for example.

With the full-wave rectification circuit comprising the cathodes of the rectifying diodes D01, D02 and the smoothing capacitor C01, since the rectifying diodes D01, D02 are connected to the terminals of the secondary winding N2, a DC output voltage corresponding to the level of the alternating voltage induced across the secondary winding N2 is produced. With the full-wave rectification circuit comprising the cathodes of the rectifying diodes D01, D02 and the smoothing capacitor C01 shown in FIG. 5, since the alternating voltage produced by the partial windings N2C, N2D of the secondary winding N2 is rectified, if the same power as in FIG. 1 is supplied, then the full-wave rectification circuit shown in FIG. 5 supplies the DC output voltage E01 on the secondary side which is lower in voltage and greater in current than with the power supply circuit shown in FIG. 1. Therefore, the power supply circuit according to the present embodiment shown in FIG. 5 has the same features as those of the power supply circuit shown in FIG. 1, but is capable of handling a low-voltage, large-current load.

With the power supply circuit shown in FIG. 5, the secondary winding N2 has a further tap output to which the anode of a rectifying diode D03 is connected, and the cathode of the rectifying diode D03 is connected to the positive terminal of the smoothing capacitor C02, thereby providing a half-wave rectification circuit for generating the DC output voltage E02 on the secondary side.

Figure 6:
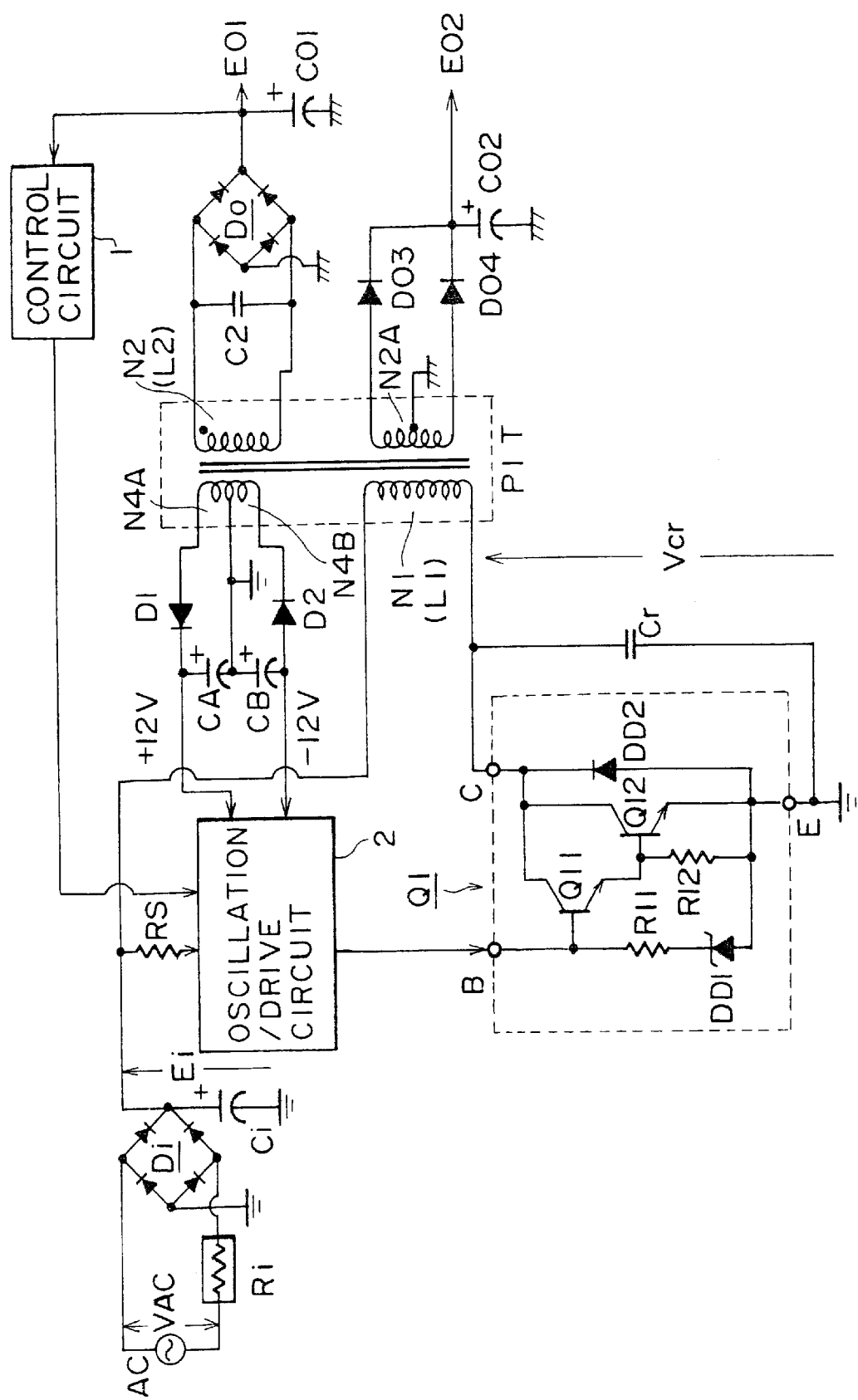
FIG. 6 is a circuit diagram of a power supply circuit according to a third embodiment of the present invention.

FIG. 6 shows a power supply circuit according to a third embodiment of the present invention. Those parts in FIG. 6 which are identical to those shown in FIG. 1 are denoted by identical reference characters, and will not be described in detail below.

In the power supply circuit shown in FIG. 6, the switching element Q1 comprises a Darlington circuit having bipolar transistors (BJT) Q11, Q12, a damper diode (zener diode) DD1, a damper diode DD2, and resistors R11, R12 connected as shown.

In the Darlington circuit, the collector of the transistor Q11 and the collector of the transistor Q12 are connected to each other, and the emitter of the transistor Q11 and the collector of the transistor Q12 are connected to each other, with the emitter of the transistor Q12 being grounded. The anode of the damper diode DD1 is connected to the emitter of the transistor Q12, and the cathode of the damper diode DD1 is connected to the base of the transistor Q11 via the resistor R11. The anode of the damper diode DD2 is connected to the emitter of the transistor Q12, and the cathode of the damper diode DD2 is connected to the collector of the transistor Q12. The resistor R12 is connected parallel between the base and emitter of the transistor Q12. In the Darlington circuit thus constructed, the base of the transistor Q11 is equivalent to the base of the switching element Q1 in each of the previous embodiments, and the junction between the collectors of the transistors Q11, Q12 is equivalent to the collector of the switching element Q1. The emitter of the transistor Q12 is equivalent to the emitter of the switching element Q1.

The self-excited oscillation circuit for driving the switching element in a self-excited manner is omitted, and an oscillation/drive circuit 2 is provided for externally excited switching drive.

In this embodiment, the insulated converter transformer PIT has windings N4A, N4B. The winding N4A, a rectifying diode D1, and a capacitor CA jointly make up a half-wave rectification circuit for generating a DC voltage of +12 V, and the winding N4B, a rectifying diode D2, and a capacitor CB jointly make up a half-wave rectification circuit for generating a DC voltage of −12 V. The DC voltages of +12 V and −12 V are supplied as an operating power supply to the oscillation/drive circuit 2.

The insulated converter transformer PIT has a structure which may be the same as the core shown in FIG. 3, but differs from the first embodiment in that the windings N4A, N4B are additionally wound in the primary side.

The oscillation/drive circuit 2 is activated by a starting resistor RS, and generates an oscillating signal in a period having a switching frequency fs. By using the operating power supply of +12 V/−12 V, the oscillation/drive circuit 2 converts the oscillating signal into a switching drive current which becomes positive (on)/negative (off) in every switching period, and outputs the switching drive current to the base of the switching element Q1. The switching element Q1 is thus driven to effect switching operation at a given switching frequency. The switching element Q1 arranged as the Darlington circuit in this embodiment provides a higher power conversion efficiency than if the switching element Q1 comprises a bipolar transistor.

The control circuit 1 shown in FIG. 6 supplies a DC signal (detected signal) having a level varied depending on the level of the secondary-side DC output voltage E01 which is a detected input, to the oscillation/drive circuit 2.

If the oscillation/drive circuit 2 is arranged to vary the switching frequency by keeping the off period of the switching element Q1 constant and varying the on period thereof depending on the detected signal inputted from the control circuit 1, then the same operation as shown in FIGS. 4(a) through 4(n) is achieved, and hence the same advantages as those of the power supply circuit shown in FIG. 1 are attained.

In the above embodiments, the switching element Q1 comprises a bipolar transistor (BJT) or a Darlington circuit having two bipolar transistors. However, either one of switching elements described below may be used instead of the switching element Q1.

FIG. 7 shows a MOS-FET (MOS Field-Effect Transistor: metal oxide film semiconductor) used in place of the switching element Q1. With the MOS-FET used, a zener diode ZD is connected in the illustrated direction parallel between the drain and source, providing a feedback current path at the time the switching is off. Specifically, the anode of the zener diode ZD is connected to the source of the MOS-FET, and the cathode of the zener diode ZD is connected to the drain of the MOS-FET. The base, the collector, and the emitter of the switching element Q1 in the previous embodiments are replaced respectively with the gate, the drain, and the source of the MOS-FET.

FIG. 8 shows an IGBT (Insulated-Gate Bipolar Transistor) used in place of the switching element Q1. A diode D is connected parallel between the collector and the emitter of the IGBT, providing a feedback current path at the time the switching is off. The anode and cathode of the diode D are connected respectively to the collector and emitter of the IGBT.

In the circuit shown in FIG. 8, the base, the collector, and the emitter of the switching element Q1 in the previous embodiments are replaced respectively with the gate, collector, and emitter of the IGBT.

FIG. 9 shows an SIT (Static Induction Thyristor) used in place of the switching element Q1. A diode D is connected parallel between the collector and the emitter of the SIT, providing a feedback current path at the time the switching is off. The anode and cathode of the diode D are connected respectively to the cathode and anode of the SIT.

In the circuit shown in FIG. 9, the base, collector, and emitter of the switching element Q1 in the previous embodiments are replaced respectively with the gate, cathode, and anode of the SIT.

With either one of the arrangements shown in FIGS. 7 through 9, it is possible to achieve a higher efficiency in the embodiments of the present invention. If the arrangements shown in FIGS. 7 through 9 are employed, then the drive circuit for the element to be employed in place of the switching element Q1 is modified to match the properties of the element. For example, it is preferable to employ an externally excited arrangement for stable operation thereof, based on the arrangement shown in FIG. 6. If the MOS-FET shown in FIG. 7, for example, is employed, then the drive circuit may be of an externally excited voltage drive arrangement.

As described above, according to the present invention, the switching power supply circuit has the voltage-resonant switching converter on the primary side and the insulated converter transformer with the loose coupling, for thereby providing operation modes (+M/−M) in which the mutual inductance of the primary winding and the secondary winding are of opposite polarities. On the secondary side, the secondary-side parallel resonant capacitor is connected parallel to the secondary winding, providing the parallel resonant circuit, and the full-wave rectification circuit is provided using the parallel resonant circuit, for producing the secondary-side DC output voltage equal to the alternating voltage (induced voltage) induced across the secondary winding.

Since the composite resonant arrangement comprising the voltage-resonant converter (parallel resonant circuit) on the primary side and the full-wave rectification circuit using the parallel resonant operation on the secondary side supplies the load with the electric power, it is possible to increase the maximum load power that can be handled, as compared with the conventional power supply circuit.

On the primary side, the ordinary full-wave rectification circuit, rather than the voltage doubler rectifying circuit, inputs the rectified and smoothed voltage having a level corresponding to the level of the AC input voltage, so that the above condition can sufficiently be handled.

As an arrangement for performing constant-voltage control to stabilize the secondary-side output voltage, the switching frequency is varied depending on the level of the secondary-side output voltage for thereby effecting composite control on the resonant impedance in the power supply circuit and the conduction angle of the switching element.

Based on the above structural details, the following advantages can be offered:

Heretofore, in order to handle the above condition, it is necessary to obtain the rectified and smoothed voltage which is twice the level of the AC input voltage with the voltage doubler rectifying circuit. To meet this requirement, it is necessary to select products of a withstand voltage depending on the switching voltage generated depending on the level of the rectified and smoothed voltage, as the switching element and the parallel resonant capacitor on the primary side.

If the DC output voltage is heretofore produced by the half-wave rectification circuit on the secondary side, then since the voltage which is about 2.5 to 3.5 times the rectified and smoothed voltage in the nonconductive period of the rectifying diodes is applied, products of a withstand voltage corresponding to such a voltage level have been selected.

According to the present invention, however, because the switching voltage depending on the level of the rectified and smoothed voltage, products of a withstand voltage which is about ½ of the conventional withstand voltage can be used as the switching element and the resonant capacitor on the primary side.

While the voltage doubler full-wave rectification circuit is employed on the secondary side, since the voltage doubler full-wave rectification circuit performs full-wave rectification during both periods in which the alternating voltage is positive and negative, the voltage applied to the rectifying diodes is held to substantially the same level as the level of the rectified and smoothed voltage, so that products of a withstand voltage lower than the conventional withstand voltage can be selected as the rectifying diodes on the secondary side.

Therefore, the cost of the switching element, the parallel resonant capacitor on the primary side, and the rectifying diodes on the secondary side can be reduced. It is also easily possible to select products with increased characteristics as the switching element and the rectifying diodes on the secondary side thereby increasing the switching frequency for an increased power conversion efficiency. Circuit components associated with the switching element can also be reduced in size and weight.

As described above, inasmuch as the circuit for obtaining the rectified and smoothed voltage from the commercial AC power supply comprises the ordinary equal-voltage rectifying circuit, one set of block-type smoothing capacitor and bridge rectifying diodes can employed, resulting in a reduction in the cost and circuit scale.

Furthermore, the number of turns of the controlled winding is reduced for thereby reducing the size, weight, and cost of the crossed control transformer used for constant-voltage control.

By varying the switching frequency, composite control is effected on the resonant impedance for the switching output and the conduction angle of the switching element for constant-voltage control. As a result, the control sensitivity is improved for an increased controllable range, so that the output voltage on the secondary side can be stabilized in a narrower switching frequency control range than heretofore. The reduction in the switching frequency control range contributes to the reduction in the number of turns of the windings in the transformers of the power supply circuit and the reduction of various components and elements in size.

In the arrangement of the constant-voltage control circuit according to the present invention, regardless of whether the circuit system for driving the switching element is self-excited or externally excited, the inductance element such as the choke coil or the controlled winding of the crossed control transformer is not connected in series to the primary winding or the secondary winding. Consequently, the generation of the leakage flux in the power supply circuit is limited to the insulated converter transformer only. Thus, it is not necessary to cover the power supply circuit with the shield case as with the conventional power supply circuit, but only the short ring of copper plate may be added to eliminate the leakage flux. In this manner, the power supply circuit itself can be reduced in size, weight, and cost, and the time required to manufacture the power supply circuit can be shortened.

The switching element may comprise the Darlington circuit of bipolar transistors, or the MOS field-effect transistor, the insulated-gate bipolar transistor, or the static induction thyristor. With these components used, it is possible to make the power conversion efficiency higher than if the switching means is constructed of a bipolar transistor.

According to the present invention, as described above, the power supply circuit having the voltage-resonant converter on the primary side can be reduced in cost, size, and weight, and various characteristics of the power supply circuit such as the power conversion efficiency can be improved.

Although certain preferred embodiments of the present invention have been shown and described in detail, it should be understood that various changes and modifications may be made therein without departing from the scope of the appended claims.

What is claimed is:

1. A switching power supply circuit comprising:

rectifying and smoothing means for being supplied with a commercial AC power supply, generating a rectified and smoothed voltage having a level nearly equal to the level of the commercial AC power supply, and outputting the generated rectified and smoothed voltage as a DC input voltage;

an insulated converter transformer having magnetical cores with a gap to provide a loose magnetical coupling coefficient, for transmitting a primary-side power to a secondary side;

switching means for turning on and off periodically said DC input voltage with a switching element and outputting a pulsating voltage to a primary winding of said insulated converter transformer;

a primary-side parallel resonant circuit comprising at least an inductance including a leakage inductance of the primary winding of said insulated converter transformer and a capacitance of a parallel resonant capacitor, for causing said switching means to operate in a voltage-resonant manner;

a secondary-side parallel resonant circuit including a secondary-side parallel resonant capacitor connected parallel to a secondary winding of said insulated converter transformer, said secondary-side parallel resonant circuit comprising an inductance of the secondary winding including a leakage inductance of said insulated converter transformer and the capacitance of said secondary-side parallel resonant capacitor;

DC output voltage generating means for being supplied with an alternating voltage induced across the secondary winding of said insulated converter transformer, and rectifying the alternating voltage by way of full-wave rectification to generate a secondary-side DC output voltage; and voltage regulating means for varying a switching frequency of said switching element depending on the level of said secondary-side DC output voltage to effect composite control on a resonant impedance of said primary-side parallel resonant circuit and a conduction angle of said switching element thereby to perform constant-voltage control over a secondary-side output voltage.

2. A switching power supply circuit according to claim 1, comprising a series resonant circuit of at least a drive winding and a resonant capacitor which are connected in series with each other, and further comprising:

a self-excited oscillation drive circuit for driving said switching element in a self-excited manner based on a resonant output from said series resonant circuit;

said voltage regulating means having a crossed transformer as a saturable reactor including a detecting winding, said driving winding connected in series to the primary winding of said insulated converter transformer, and a control winding which are wound perpendicularly to said detecting and drive windings, the arrangement being such that a control current variable dependent on the secondary-side DC output voltage is supplied to said control winding to vary an inductance of said drive winding thereby to variably control the switching frequency.

3. A switching power supply circuit according to claim 1, wherein said switching means comprises an externally excited drive circuit for driving said switching element in an externally excited manner;

said constant-voltage control means comprising means for keeping a turning off period of said switching element constant and variably controlling a turning on period of said switching element depending on the level of said secondary-side DC output voltage for variably controlling said switching frequency.

4. A switching power supply circuit according to claim 1, wherein said switching means comprises a Darlington circuit providing bipolar transistors as one switching element.

5. A switching power supply circuit according to claim 1, wherein said switching means comprises a MOS field-effect transistor as said switching element.

6. A switching power supply circuit according to claim 1, wherein said switching means comprises an insulated-gate bipolar transistor as said switching element.

7. A switching power supply circuit according to claim 1, wherein said switching means comprises a static induction thyristor as said switching element.

* * * * *